(12) United States Patent
Nance et al.

(10) Patent No.: US 11,402,179 B2
(45) Date of Patent: Aug. 2, 2022

(54) SMART PERSONAL SAFETY DEVICE

(71) Applicant: SABRE Security Equipment Corporation, Fenton, MO (US)

(72) Inventors: Robert Nance, Des Peres, MO (US); David Nance, Chicago, IL (US); Emily Schwartz, Sleepy Eye, MN (US)

(73) Assignee: Security Equipment Corporation, Fenton, MO (US)

( * ) Notice: Subject to any disclaimer, the term of this patent is extended or adjusted under 35 U.S.C. 154(b) by 375 days.

(21) Appl. No.: 16/735,276

(22) Filed: Jan. 6, 2020

(65) Prior Publication Data

US 2020/0217625 A1 Jul. 9, 2020

Related U.S. Application Data (60) Provisional application No. 62/789,287, filed on Jan. 7, 2019.

(51) Int. Cl.
| | |
|---|---|
| H04W 4/90 | (2018.01) |
| F41H 9/10 | (2006.01) |
| H04B 1/034 | (2006.01) |
| H04W 4/80 | (2018.01) |
| H04W 76/14 | (2018.01) |

(52) U.S. Cl.
CPC .............. *F41H 9/10* (2013.01); *H04B 1/0346* (2013.01); *H04W 4/80* (2018.02); *H04W 4/90* (2018.02); *H04W 76/14* (2018.02)

(58) Field of Classification Search
CPC . F41H 9/10; H04W 4/80; H04W 4/90; H04W 76/14; H04B 1/0346; H04B 1/3888; H04B 1/202; H04L 67/12
See application file for complete search history.

(56) References Cited

U.S. PATENT DOCUMENTS

| | | | |
|---|---|---|---|
| 10,520,282 B2* | 12/2019 | Nangunoori | G08B 15/004 |
| 2015/0069082 A1* | 3/2015 | Breeden | F41H 9/10 |
| | | | 222/402.1 |
| 2015/0312399 A1* | 10/2015 | Teig | F41H 13/0087 |
| | | | 455/456.3 |
| 2015/0327092 A1* | 11/2015 | Martch | H04N 21/6582 |
| | | | 455/67.7 |
| 2016/0196736 A1* | 7/2016 | Nolan | G08B 15/004 |
| | | | 340/6.1 |
| 2017/0087576 A1* | 3/2017 | Fang | B05B 12/12 |
| 2018/0087769 A1* | 3/2018 | Pires | G08B 15/004 |
| 2022/0047742 A1* | 2/2022 | Choi | A61L 2/10 |

\* cited by examiner

*Primary Examiner* — Andrew Wendell
(74) *Attorney, Agent, or Firm* — SpencePC; Anthony Wenn (57) ABSTRACT

A smart personal safety device includes a chemical irritant that may be dispersed by a user in the event of a threat by an attacker. The smart personal safety device includes an alert signal sent when the user activates the smart personal safety device, sending an alert signal to a mobile device for security alert management by software contained on the mobile device.

20 Claims, 8 Drawing Sheets

SMART PERSONAL SAFETY DEVICE

CROSS REFERENCE TO RELATED APPLICATION

This application claims the benefit of U.S. Provisional Application No. 62/789,287, filed on Jan. 7, 2019.

FIELD OF INVENTION

This invention relates to personal safety device holders, specifically a smart personal safety device that can send an alert to a mobile device upon activation of the smart personal safety device.

BACKGROUND OF THE INVENTION

Personal safety devices, such as pepper spray and pepper gel canisters, are commonly used as self-defense devices to deter and/or fight off attackers. Users generally carry these personal safety device holders in pant, jacket, or shirt pockets for easy accessibility in case of an attack. However, a user of these devices may be in a location where no help is in the immediate vicinity. Alert signal devices such as sirens, whistles or panic buttons exist. However, these have limited range and do not communicate with specific contacts, such as emergency services or emergency contacts for the user. Therefore, what is needed is a smart personal safety device that can send an alert to a mobile device which can process security alerts and contact specific agencies or people in the event of deploying the smart personal safety device by a user.

SUMMARY OF THE INVENTION

In one embodiment, a smart personal safety device includes a personal safety device with a body containing a solvent tank to store chemical irritants such as pepper spray or pepper gel. The solvent tank is activated to disperse the chemical irritant through a nozzle when the user depresses a press key/actuator. At the same time, the solvent tank contacts a pressure plate coupled with a printed circuit board (PCB) assembly containing a Bluetooth® module. The Bluetooth® module can then send an alert signal to a mobile device paired with the smart personal safety device.

In another embodiment, a smart personal safety device includes a personal safety device with a body containing a solvent tank to store chemical irritants such as pepper spray or pepper gel. The solvent tank is activated to disperse the chemical irritant through a nozzle when the user depresses a press key/actuator. At the same time, the solvent tank contacts a pressure plate coupled with a PCB assembly containing a Bluetooth® module. The Bluetooth® module can then send an alert signal to a mobile device paired with the smart personal safety device. The mobile device runs a software application that manages security alerts received by the smart personal safety device paired via Bluetooth® with the mobile device. The software application may send messages, make telephone calls or send emails or other communications to the designated contacts managed by the software application.

Other systems, methods, features and advantages of the invention will be, or will become, apparent to one with skill in the art upon examination of the following figures and detailed description. It is intended that all such additional systems, methods, features and advantages be included within this description, be within the scope of the invention, and the claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
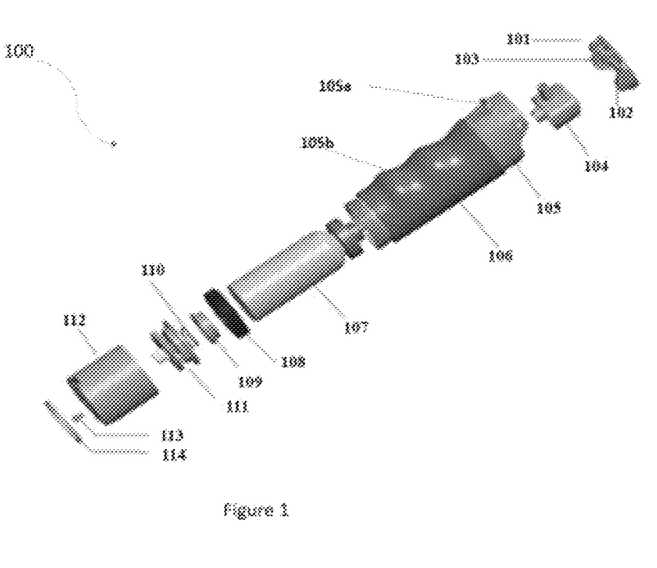
FIG. 1 illustrates a top perspective exploded view of a smart personal safety device.

FIG. 1 displays one embodiment of a smart personal safety device 100. FIG. 1 illustrates an exploded view of a smart personal safety device 100. A protection cap 101, a pin 102, a first biasing mechanism 103 and a press key 104 are operatively connected and coupled to a body 105. In certain embodiments, the first biasing mechanism 103 may be a spring or torsion spring; however other mechanisms may be chosen by one skilled in the art, as desired. The pin 102, first biasing mechanism 103 and press key 104 are housed inside of portion of body 105.

The body 105 includes a protruding nozzle 105*a* and a finger grip 105*b* disposed externally on the body 105. A rubber body cover 106 is disposed upon the body 105. The finger grip 105*b* may be molded out of and/or formed upon the rubber body cover 106. A solvent tank 107 is contained within body 105. In certain embodiments, the solvent tank 107 may contain a gel that is used to deter threats by using a chemical irritant. Other chemicals and substances known in the art may be used as well, such as pepper spray. The press key/actuator 104 serves as the dispensing unit for the chemical irritant dispensed by the smart personal safety device 100. The protruding nozzle 105*a* serves as a safety to prevent a user from placing their finger over the dispensed spray. The chemical irritant may be a gel stream, cone, foam, or Phantom delivery of oleo resin *capsicum* (Phantom OC®), CS Tear Gas, Pava, UV Dye, Staining Dye or a combination of these irritants or other irritant substances known in the art, such as pepper spray. The press key/ actuator 104 is operably connected and in communication with the solvent tank 107. The chemical irritant is dispersed when a user depresses the press key/actuator 104, possibly in response to a threat such as an assailant or dangerous animal approaching the user. The chemical irritant is configured to repel a threat by its chemical nature, which may disable or scare away the threat. The relative orientation and positioning of hand grip 105*b* and the protruding nozzle 105*a* ensure the user is aiming in the proper direction when in low-light situations to be most effective in warding off or repelling attackers.

A PCB base 108 is operatively coupled to the base of the solvent tank 107. A pressure plate 109 and a second biasing mechanism 110 are operatively coupled to the PCB base 108 and thereby in communication with the solvent tank 107. In certain embodiments, the second biasing mechanism 110 may be a spring or torsion spring; however other mechanisms may be chosen by one skilled in the art, as desired. A PCB assembly 111 is disposed and in mechanical communication with the second biasing mechanism 110, mechanically coupled thereby with the pressure plate 109. The PCB assembly 111 includes a battery, such as a button cell battery (e.g., CR2032) and wireless transmitter for electromagnetic communication with an external device, such as a cellphone, smartphone or other remote device that can communicate via wireless technology. When the device is pressed via the press key/actuator 104, the solvent tank 107 lowers and depresses onto the pressure plate 109. The pressure plate 109 mechanically actuates the PCB assembly 111 via the second biasing mechanism 110 to activate the wireless transmitter within the PCB assembly 111. The wireless transmitter is configured to transmit a message to a remote device.

The pressure plate 109, the second biasing mechanism 110 and the PCB assembly 111 are contained in a tail cover 112. The tail cover 112 attaches with the PCB base 108 and the body 105 to house the components described above within the smart personal safety device 100 described above. Further, a light guide column 113 is disposed within the tail cover 112. The light guide column 113 changes color to communicate battery strength and/or connectivity to a mobile device. A metal ring 114 is disposed upon the tail cover 112 to form a base for the smart personal safety device 100. A keyring may be disposed upon and connected to the tail cover 112 or metal ring 114 to allow storage of the device or attachment of clips, keys, other devices or accessories. A pairing button configured for pairing the smart personal safety device with a mobile device may also be disposed upon the tail cover 112 or metal ring 114. The pair button is communicatively coupled with the PCB assembly 111.

Figure 2:
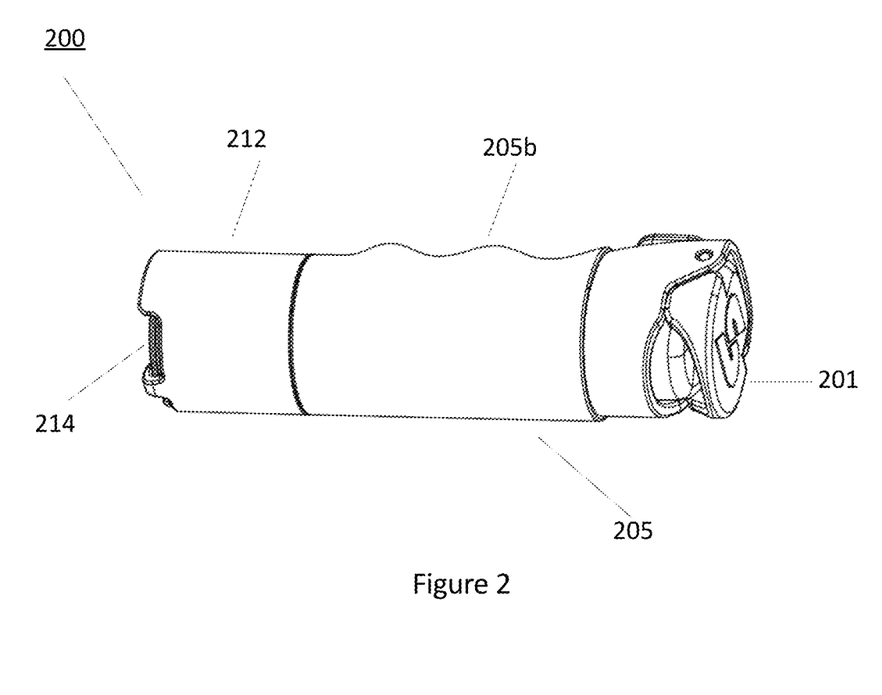
FIG. 2 illustrates a side elevational view of an embodiment of a smart personal safety device.

FIG. 2 displays another view of a smart personal safety device 200. This view displays an exterior view of the smart personal safety device 200. A protection cap 201 is operably connected to a body 205. The body 205 has disposed and/or formed thereupon a rubber body cover 206. A finger grip 205*b* is disposed upon or integral with the rubber body cover 206. Within the body 205, a solvent tank (not shown here but such as that illustrated in FIG. 1 as solvent tank 107) is contained. The solvent tank may contain chemicals or substances that function as an irritant against threats a used of the device may encounter, such as people or animals. A pressure plate, spring and PCB assembly (not shown here but such as that illustrated in FIG. 1 as pressure plate 109, second biasing mechanism 110 and PCB assembly 111) are contained with the body 205. As described in conjunction with FIG. 1 above, when a press key/actuator (not shown in FIG. 2 but contained within body 205) is depressed by a user, the solvent tank presses against the pressure plate and spring to communicate with and activate the PCB assembly contained within the body 205. A signal is then transmitted by the wireless transmitter housed on the PCB assembly. A signal is transmitted to a remote device that operates a software application that receives the signal via the remote device and can send an alert, such as a text message, SMS message, or call a pre-designated number to alert another entity, such as emergency service, a 911 operator, or a designated contact that the user selects.

The body 205 is operably connected to a tail cover 212. A metal ring 214 is operably connected to the tail cover 212. As described above, a keyring may be connected or integrated with the metal ring 214 or the tail cover 212 to allow storage of the device 200 or attachment of keys, other devices or accessories to the device 200. The tail cover 212 may be unscrewed from the body 205 so that a solvent tank may be replaced once consumed by usage or at certain times for maintenance. A pairing button configured for pairing the smart personal safety device with a mobile device may also be disposed upon the tail cover 212 or metal ring 214. The pair button is communicatively coupled with the PCB assembly.

Figure 3:
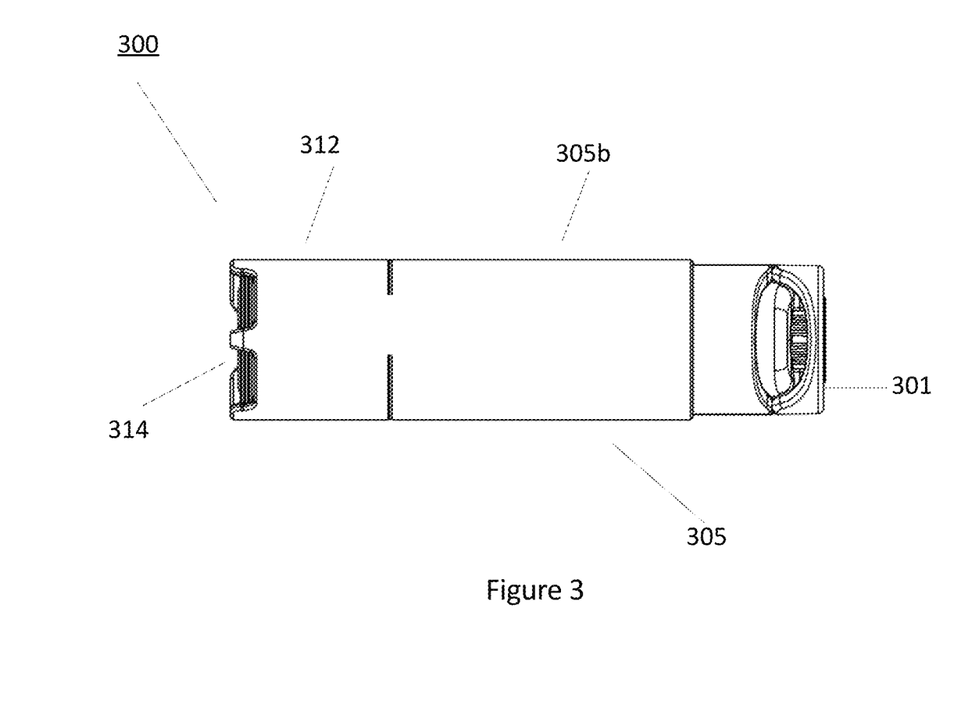
FIG. 3 illustrates a rear elevational view of an embodiment of a smart personal safety device.

FIG. 3 displays another view of a smart personal safety device 300. This view displays an exterior view of the smart personal safety device 300. A protection cap 301 is operably connected to a body 305. In certain embodiments the body 305 may have a rubber body cover. Within the body 305, a press key/actuator and a solvent tank (not shown here but such as that illustrated in FIG. 1 as press key/actuator 104 and solvent tank 107, respectively) is contained. The solvent tank may contain chemicals or substances that function as an irritant against threats a user of the device may encounter, such as people or animals. The chemical irritant may be a gel, stream, cone, foam, or Phantom delivery of oleo resin *capsicum* (Phantom OC®), CS Tear Gas, Pava, UV Dye, Staining Dye or a combination of these irritants or other irritant substances known in the art, such as pepper spray. A pressure plate, spring and PCB assembly (not shown here but such as that illustrated in FIG. 1 as pressure plate 109, second biasing mechanism 110 and PCB assembly 111) are contained with the body 305. As described in conjunction with FIG. 1 above, when press key/actuator is depressed by a user, the solvent tank presses against the pressure plate and spring to communicate with and activate the PCB assembly contained within the body 305. A signal is then transmitted by the wireless transmitter housed on the PCB assembly. A signal is transmitted to a remote device that operates a software application that receives the signal via the remote device and can send an alert, such as a text message, SMS message, or call a pre-designated number to alert another entity, such as emergency service, a 911 operator, or a designated contact that the user selects.

The body 305 is operably connected to a tail cover 312. A metal ring 314 is operably connected to the tail cover 312. As described above, a keyring may be connected or integrated with the metal ring 314 or the tail cover 312 to allow storage of the device 300 or attachment of keys, other devices or accessories to the device 300. The tail cover 312 may be unscrewed from the body 305 so that a solvent tank may be replaced once consumed by usage or at certain times for maintenance. A pairing button configured for pairing the smart personal safety device with a mobile device may also be disposed upon the tail cover 312 or metal ring 314. The pair button is communicatively coupled with the PCB assembly.

Figure 4:
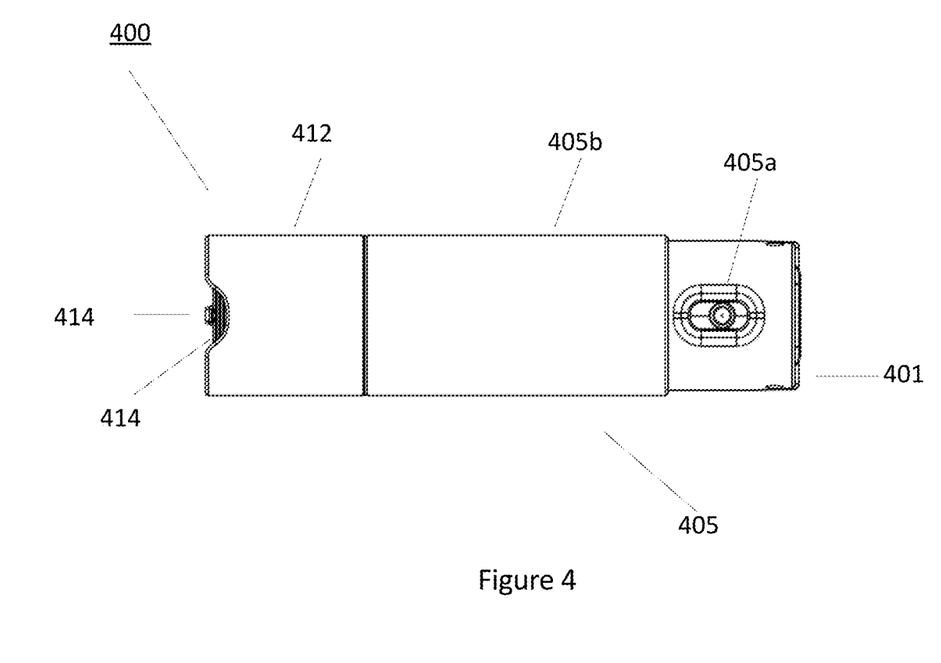
FIG. 4 illustrates a front elevational view of an embodiment of a smart personal safety device.

FIG. 4 displays another view of a smart personal safety device 400. This view displays an exterior view of the smart personal safety device 400. A protection cap 401 is operably connected to a body 405. An aperture on the body 405 allows a press key/actuator to interact with a solvent tank to disperse a chemical irritant through a protruding nozzle 405*a*. The protruding nozzle 405*a* serves as an external safety to prevent a user from placing their finger over the dispersed chemical irritant spray. As described above in relation to FIG. 1, press key/actuator is operably connected and in communication with a solvent tank. The chemical irritant is dispersed when a user depresses the press key/actuator, possibly in response to a threat such as an assailant or dangerous animal approaching the user. The chemical irritant is configured to repel a threat by its chemical nature, which may disable or scare away the threat. The chemical irritant may be a gel, stream, cone, foam, or Phantom delivery of oleo resin *capsicum* (Phantom OC®), CS Tear Gas, Pava, UV Dye, Staining Dye or a combination of these irritants or other irritant substances known in the art, such as pepper spray.

In certain embodiments, the body 405 may have disposed and/or formed thereupon a rubber body cover. Within the body 405, a solvent tank (not shown here but such as that illustrated in FIG. 1 as solvent tank 107) is contained. The solvent tank may contain chemicals or substances that function as an irritant against threats a user of the device may encounter, such as people or animals. A pressure plate, spring and PCB assembly (not shown here but such as that illustrated in FIG. 1 as pressure plate 109, second biasing mechanism 110 and PCB assembly 111) are contained within the body 405. As described in conjunction with FIG. 1 above, when the press key/actuator is depressed by a user, the solvent tank presses against the pressure plate and spring to communicate with and activate the PCB assembly contained within the body 405. A signal is then transmitted by the wireless transmitter housed on the PCB assembly. A signal is transmitted to a remote device that operates a software application that receives the signal via the remote device and can send an alert, such as a text message, SMS message, or call a pre-designated number to alert another entity, such as emergency service, a 911 operator, or a designated contact that the user selects. As a non-limiting example, the remote device may be a mobile device, a computer, a tablet, or a Wi-Fi router; however other remote devices may be chosen by one skilled in the art as desired.

The body 405 is operably connected to a tail cover 412. A light guide column 413 is in communication with the tail cover 412. The light guide column 413 changes color to communicate battery strength and/or connectivity to a mobile device. A metal ring 414 is operably connected to the tail cover 412. As described above, a keyring may be connected or integrated with the metal ring 414 or the tail cover 412 to allow storage of the device 400 or attachment of keys, other devices or accessories to the device 400. The tail cover 412 may be unscrewed from the body 405 so that a solvent tank may be replaced once consumed by usage or at certain times for maintenance. A pairing button configured for pairing the smart personal safety device with a mobile device may also be disposed upon the tail cover 412 or metal ring 414. The pairing button is communicatively coupled with the PCB assembly.

Embodiments of the smart personal safety device include an interface with a mobile device by creating a system in which a triggering key within the smart personal safety device wirelessly communicates (e.g., via Bluetooth®) with a mobile device that hosts a software application (i.e., the interface module) for managing a security alert system. The mobile device may be a cell phone, smart phone, tablet, portable computer, PDA or other mobile electronic devices with wireless capability, such as a Bluetooth® interface. In one embodiment, the mobile device may be a smartphone such as an Apple iOS device with Bluetooth® capability (such as an iPhone or cellular-equipped iPad) or an Android OS device with Bluetooth® and cellular capability.

A mobile device software application that manages a security alert system in tandem with a smart personal safety device such as that described in relation to FIGS. 1-4 above may be configured in multiple ways. An example configuration, including an example set-up of the application and pairing of the mobile device and software application with a smart personal safety device is illustrated in FIGS. 5a-7e. These example screen displays are generated from an Apple iPhone, but other mobile device types and software configurations are possible. One of skill in the art would understand how to modify these examples for other mobile devices, operating systems and application languages or configurations.

Figure 5A:
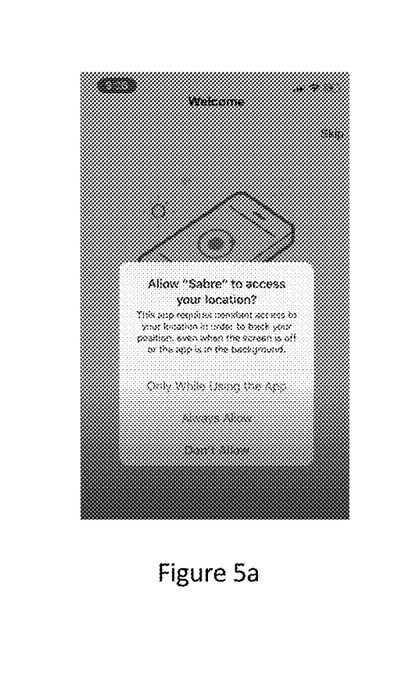
FIGS. 5*a*-5*d* illustrate an embodiment for a software application that manages security alerts received from a smart personal safety device, on a mobile device
Figure 5B:
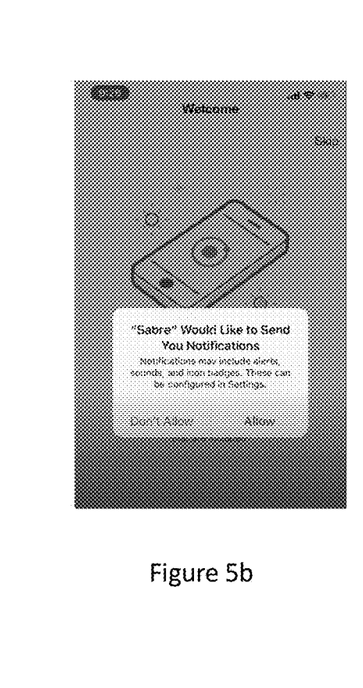
Figure 5C:
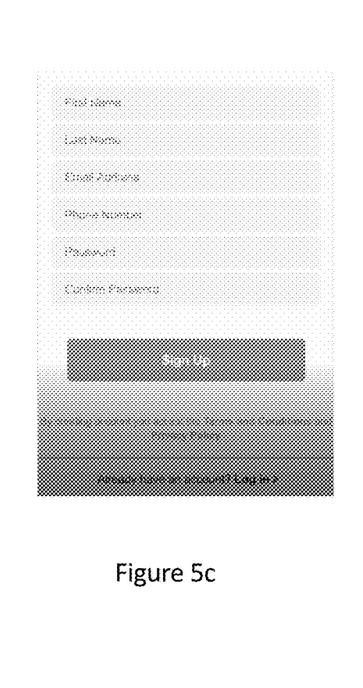
Figure 5D:
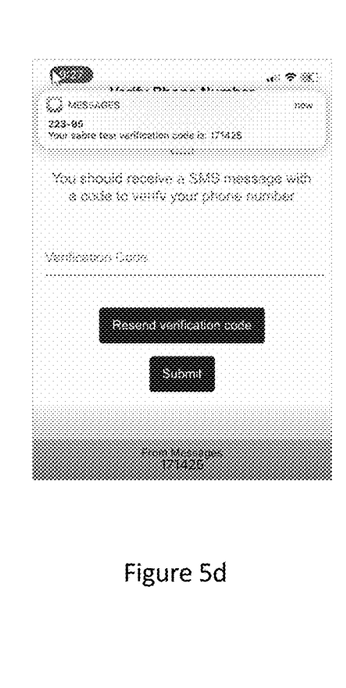

FIGS. 5a-5d illustrates one embodiment for setting up a user profile on a mobile device software application that manages a security alert system in tandem with a smart personal safety device. FIGS. 5a-5d illustrate screen captures from a Sabre application operating on an Apple iPhone running Apple iOS. As described, other mobile devices and operating systems may allow similar functionality. FIG. 5a illustrates a step in the set-up process where a user is asked to allow access by the software application to the user's location determined by the mobile device's location-determining functionality. This location may be determined using GPS, assisted GPS (aGPS), cellular tower triangulation, WiFi, Bluetooth® or combinations of these technologies or other location-determining technologies. FIG. 5b illustrates a step in the set-up process where the software application asks permission to send notifications to the user, such as alerts, sounds, or icon badges. Other notification types and settings may be possible. FIG. 5c shows how the software application allows a user to either create a new account with the software application and associated services, or login with an existing account. If a new account is created, FIG. 5d illustrates a step where a verification code is sent to the user's mobile device to confirm this is a legitimate account. Such a verification code may be sent via text message, SMS message, email or voice call, for example.

Figure 6A:
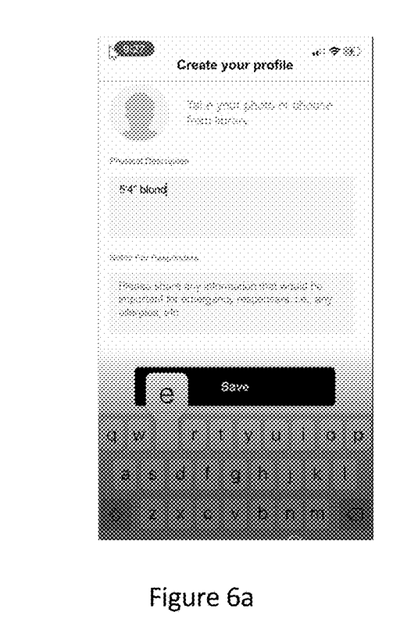
FIGS. 6*a*-6*d* illustrate another embodiment for a software application that manages security alerts received from a smart personal safety device, on a mobile device.

Once a user has logged in and verification has been completed, a new user may create or edit a profile for the software application on the mobile device to manager security alerts for the user. Example information requested is illustrated in FIG. 6a. For example, a physical description, including height, build, hair color, eye color, or other identifying physical information may be entered into a profile. Information pertinent to emergency authorities, such as medical history, allergies, blood type, personal medical and legal requirements or other relevant information may be entered into a profile. Other types of information may be entered as well.

Figure 6B:
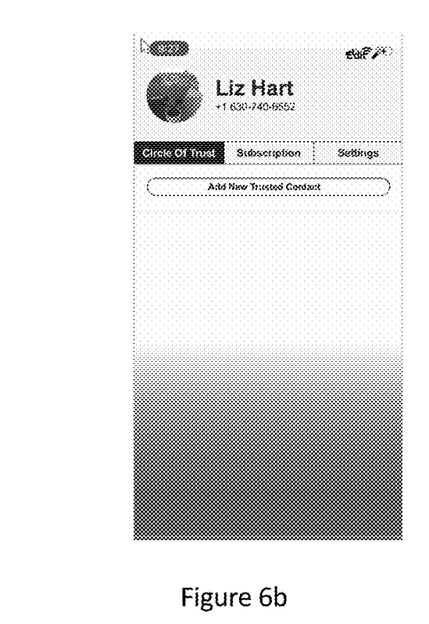
Figure 6C:
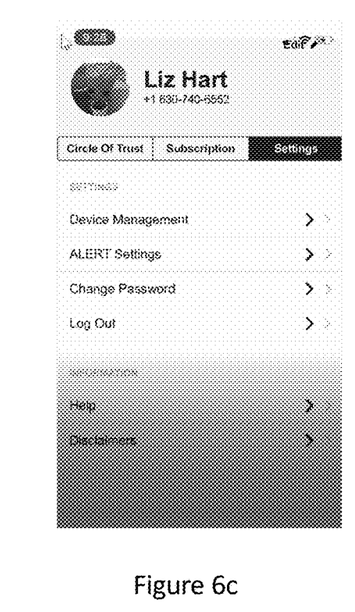
Figure 6D:
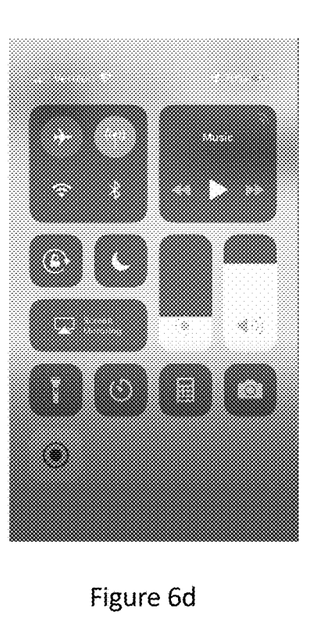

FIG. 6b illustrates another aspect of the software application profile management. Trusted contacts may be selected from a user's contact list who may be notified in the event of an emergency use of the smart personal safety device. FIG. 6c illustrates more options that may be selected or edited for the software application security alert setup and profile modification. Alert settings and type of subscription may be modified. Once a profile has been setup and confirmed, an icon may appear in a mobile device's control center, such as illustrated in one embodiment in FIG. 6d.

FIGS. 7a-7e illustrate one embodiment of pairing a smart personal safety device, such as those described in reference to FIGS. 1-4 above, with a mobile device. In one embodiment, a smart personal safety device may be paired via Bluetooth® with an Apple iPhone, as illustrated in FIGS.

7a-7e. Other embodiments involving different smart personal safety devices with different mobile devices are possible.

Figure 7A:
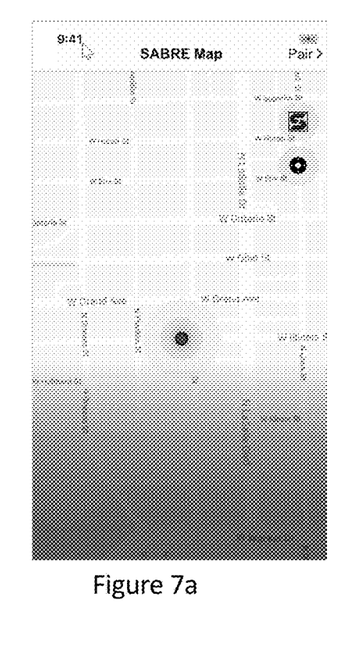
FIGS. 7*a*-7*e* illustrate an embodiment for pairing a smart personal safety device with a mobile device.
Figure 7B:
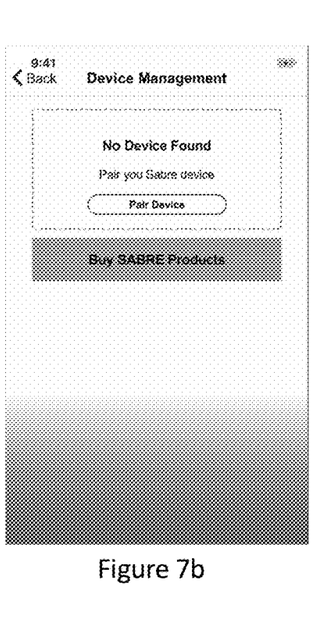
Figure 7C:
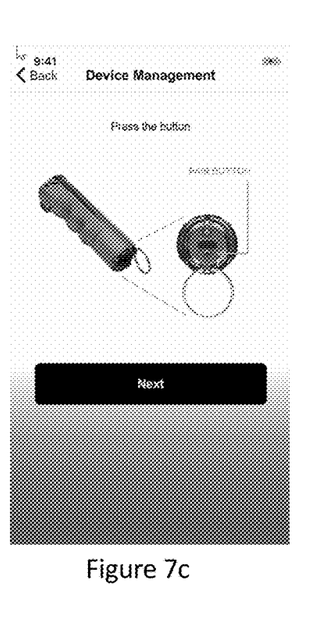

FIG. 7a illustrates a device management configuration step, where the user's mobile device location is indicated on a map. As described above, this location may be determined by various means, often through GPS or WiFi location-determination. A user can then elect to pair the mobile device with a Bluetooth®-capable smart personal safety device. FIG. 7b illustrates a step in the pairing process where a user is notified that no smart personal safety devices are currently paired with the user's mobile device in the software application. FIG. 7c illustrates a step in the pairing process where a user is instructed how to pair the smart personal safety device with the mobile device. As illustrated in FIG. 7c, one embodiment involves the user pressing a "pair button" on a smart personal safety device (such as that illustrated in FIGS. 1-4 above). The wireless transmitter on the PCB assembly in an example smart personal safety device described herein will then interface with the software application on the mobile device via communication modules and communication software on the mobile device. The smart personal safety device will provide identifying and authenticating information to the mobile device to allow pairing. Bluetooth® pairing is known to those of skill in the art.

Figure 7D:
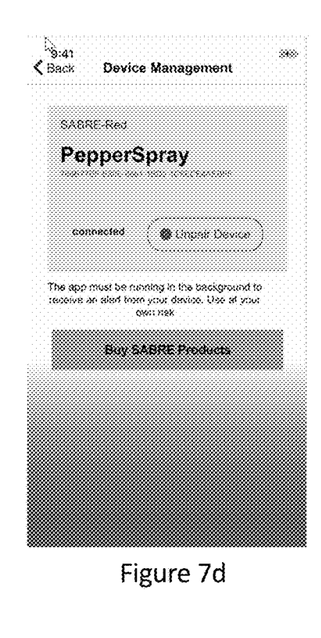
Figure 7E:
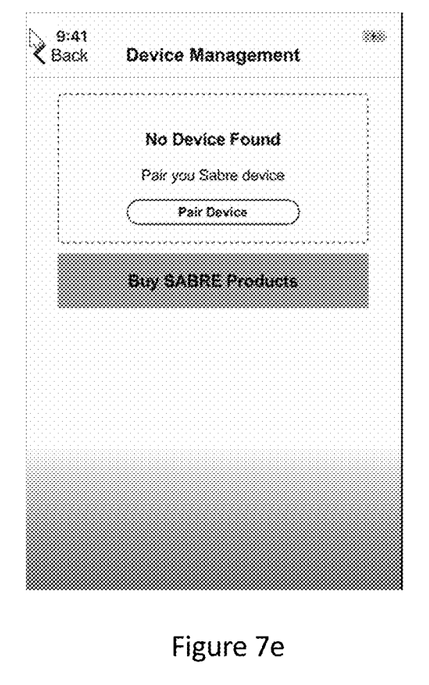

FIG. 7d illustrates a successful pairing of the smart personal safety device with the mobile device via the software application that manages security alerts. In one embodiment, the software application must then run in the background of the mobile device operating system in order to receive alerts from a smart personal safety device paired with the mobile device and to process such alerts for transmission, for example.

Also, as illustrated in FIG. 7d, a user in one embodiment may "unpair" the smart personal safety device from the mobile device running the software application that manages security alerts. In FIG. 7d, a button on the screen of the mobile device allows this unpairing. If "unpair" is selected, the Bluetooth® connection between the smart personal safety device and the mobile device is severed. A user may pair the smart personal safety device and the mobile device again using similar steps as illustrated in FIGS. 7a-7d.

Once paired, the smart personal safety device and mobile device are in communication at least via the Bluetooth® channel between the two. Environmental conditions, interference, substantial separation distance between the two devices, or power levels on either device may cause the Bluetooth® connection to sever as well.

During pairing and while the software application is running on the mobile device, and the smart personal safety device has adequate power to maintain a Bluetooth® connection with the mobile device, the software application may manage security alerts emanating from the smart personal safety device. As described above in relation to FIGS. 1-4, a security alert may be generated when a user of the smart personal safety device depresses the press key/actuator on the smart personal safety device, triggering activation of the irritant spray and causing the PCB assembly to send a signal via the wireless transmitter to the connected mobile device to indicate a security alert requiring action by the software application on the mobile device. Security alerts might include emergency calls to 911, phone calls to designated or trusted contacts, text, SMS, emails or other modes of communication to indicate a security alert triggered by the user of the smart personal safety device depressing the press key/actuator to activate the smart personal safety device chemical irritant dispersal and alert signal.

While various embodiments of the invention have been described, it will be apparent to those of ordinary skill in the art that many more embodiments and implementations are possible within the scope of the invention.

What is claimed:

1. A personal safety device comprising:
   a body having an actuator in communication with a solvent tank, a pressure plate, a PCB assembly, and a wireless transmitter, the wireless transmitter configured to send an electromagnetic communication to a remote device;
   a tail cover that is removably connected to the body; and
   a light guide column that is in communication with the wireless transmitter, the light guide column configured to change colors in response to communications from the wireless transmitter, and the light guide column operably connected to the tail cover.

2. The personal safety device of claim 1, wherein the remote device is a mobile device operating a software application adapted to receive the alert signal.

3. The personal safety device of claim 1, wherein the wireless transmitter is a Bluetooth® module.

4. The personal safety device of claim 1, wherein the PCB assembly houses the wireless transmitter.

5. The personal safety device of claim 1, wherein a pairing button is disposed on the tail cover.

6. The personal safety device of claim 1, wherein at least one finger grip is disposed on the body.

7. The personal safety device of claim 1, wherein the body has a protruding nozzle.

8. The personal safety device of claim 1, wherein the solvent tank contains an irritant.

9. The personal safety device of claim 8, wherein the irritant is at least one of an oleo resin *capsicum*, a CS Tear Gas, a Pava, a UV Dye, a Staining Dye, pepper spray or any combination thereof.

10. The personal safety device of claim 5, wherein the pairing button is configured to transmit the electromagnetic communication from the wireless transmitter to the remote device.

11. The personal safety device of claim 1, wherein the electromagnetic communication is a text message, an SMS message, a call, or an email.

12. A personal safety device comprising:
   a body having at least one finger grip and a protruding nozzle;
   a wireless transmitter, the wireless transmitter configured to send an electromagnetic communication to a remote device;
   an actuator in communication with the protruding nozzle;
   a solvent tank containing an irritant, the solvent tank having a base, the solvent tank in communication with the protruding nozzle and the actuator;
   a tail cover removably connected to the body, and the tail cover having a light guide column that is in communication with the wireless transmitter and the light guide column configured to change colors in response to communications from the wireless transmitter;
   a pressure plate operatively coupled to the base of the solvent tank;
   a biasing mechanism operatively coupled to the tail cover; and
   a PCB assembly operatively coupled to the biasing mechanism, the PCB assembly having a battery and the wireless transmitter.

13. The personal safety device of claim 12, wherein a pairing button is disposed on the body of the personal safety device.

14. The personal safety device of claim 13, wherein the pairing button is configured to transmit an electromagnetic communication from the wireless transmitter to the remote device.

15. A personal safety system comprising:
  a personal safety device having a body with an actuator in communication with a solvent tank, a pressure plate, a PCB assembly, and a wireless transmitter, the personal safety device configured to generate an electromagnetic communication through the wireless transmitter;
  a tail cover that is removably connected to the body;
  a light guide column that is operably connected to the tail cover, the light guide column being in communication with the wireless transmitter, and the light guide column configured to change colors in response to communications from the wireless transmitter; and
  a mobile device in communication with the personal safety device, the mobile device configured to receive the electromagnetic communication from the wireless transmitter and send an alert to a predetermined contact.

16. The personal safety system of claim 15, wherein a pairing button is disposed on the body of the personal safety device.

17. The personal safety system of claim 16, wherein the pairing button is configured to transmit an electromagnetic communication from the wireless transmitter to the mobile device.

18. The personal safety system of claim 15, wherein the light guide column is configured to represent the signal strength between the wireless transmitter and the mobile device.

19. The personal safety system of claim 15, wherein the mobile device communicates with the predetermined contacts using at least one of a text message, an SMS message, a call, or an email.

20. The personal safety system of claim 15, wherein the predetermined contact includes at least one of an emergency service or an emergency contact.

* * * * *